United States Patent
Korol

(10) Patent No.: US 8,638,009 B2
(45) Date of Patent: Jan. 28, 2014

(54) CORROSION REDUCING TWO-WIRE CONTROL SYSTEMS

(75) Inventor: Alex Korol, Diamond Bar, CA (US)

(73) Assignee: The Toro Company, Bloomington, MN (US)

( * ) Notice: Subject to any disclaimer, the term of this patent is extended or adjusted under 35 U.S.C. 154(b) by 374 days.

(21) Appl. No.: 12/893,938

(22) Filed: Sep. 29, 2010

(65) Prior Publication Data

US 2011/0080049 A1    Apr. 7, 2011

Related U.S. Application Data

(60) Provisional application No. 61/247,414, filed on Sep. 30, 2009.

(51) Int. Cl.
  *B01D 59/40* (2006.01)
  *H01B 7/28* (2006.01)
(52) U.S. Cl.
  USPC ........................................................... 307/95
(58) Field of Classification Search
  USPC ................ 307/95, 137, 138, 149; 239/67–70; 204/404; 205/724, 725
  See application file for complete search history.

(56) References Cited

U.S. PATENT DOCUMENTS

| | | | |
|---|---|---|---|
| 3,521,130 A | 7/1970 | Davis et al. | |
| 3,578,245 A | 5/1971 | Brock | |
| 3,723,827 A | 3/1973 | Griswold et al. | |
| 4,241,375 A | 12/1980 | Ruggles | |
| 5,057,720 A | 10/1991 | Hattori | |
| 6,121,800 A | 9/2000 | Leighton | |
| 6,865,417 B2 | 3/2005 | Rissmann et al. | |
| 7,064,459 B1 * | 6/2006 | Staerzl | 307/95 |
| 7,146,255 B2 | 12/2006 | Christiansen | |
| 7,186,321 B2 * | 3/2007 | Benham | 204/196.36 |
| 7,358,626 B2 * | 4/2008 | Gardner et al. | 307/40 |
| 7,421,317 B2 * | 9/2008 | Christiansen | 700/284 |
| 7,854,832 B2 * | 12/2010 | Komatsu et al. | 205/724 |
| 8,118,983 B1 * | 2/2012 | Anderson et al. | 204/196.11 |
| 2003/0217766 A1 * | 11/2003 | Schroeder et al. | 136/230 |

* cited by examiner

*Primary Examiner* — Rexford Barnie
*Assistant Examiner* — Rasem Mourad
(74) *Attorney, Agent, or Firm* — Inskeep IP Group, Inc.

(57) ABSTRACT

A control system for a two-wire power and communication system is described herein. A gateway connects to an irrigation controller and at least two wires that are further connected to a plurality of decoders. The gateway includes an H-bridge circuit that creates an alternating potential at the same potential or lower than the nearby ground. In this respect, when one of the at least two communication wires are damaged, little or no wire corrosion will occur.

18 Claims, 4 Drawing Sheets

CORROSION REDUCING TWO-WIRE CONTROL SYSTEMS

RELATED APPLICATIONS

This application claims priority to U.S. Provisional Application Ser. No. 61/247,414 filed Sep. 30, 2009 entitled Corrosion Reducing Two-Wire Control Systems, the contents of which are incorporated in their entirety herein.

BACKGROUND OF THE INVENTION

Large commercial irrigation systems such as those used on golf courses or croplands use sprinklers, sensors or other components that are normally powered from 24 V AC power lines that can be several miles long and can serve many hundreds of components. Various systems have been proposed for powering and controlling the components of such a system with just two wires. For example, U.S. Pat. No. 3,521,130 to Davis et al., U.S. Pat. No. 3,723,827 to Griswold et al., and U.S. Pat. No. 4,241,375 to Ruggles (each of which is incorporated herein by reference) disclose systems in which sprinkler valves along a cable are turned on in sequence by momentarily interrupting the power or transmitting an advance signal from time to time.

A problem with this approach is that it does not allow the operator to freely turn on or off any selected sprinkler or set of sprinklers at different times. This problem is typically resolved by providing separate controllers in the field to operate groups of sprinklers in accordance with a program stored in them, or transmitted to them by radio or other means. Alternatively, it has been proposed, as for example in U.S. Pat. No. 3,578,245 to Brock (which is incorporated herein by reference), to operate individual sprinkler sets from a central location by superimposing a frequency-modulated signal or DC pulses onto the 24 V AC power line.

All of these approaches are expensive. For example, a system with hundreds of sprinklers requires miles of expensive, heavy wiring to accommodate the current drawn by a large number of valves that may be watering simultaneously. Also, heavy use of D.C. current may cause electrolysis issues with electrical components.

One alternative to these traditional irrigation systems are two-wire power and communications systems, such as the system shown in U.S. Pat. No. 7,358,626, the contents of which are incorporated by reference. In such systems, two wires supply both A.C. power and digital control communications from a controller to a plurality of decoders.

While these A.C. power and digital communication systems generally work well, they also have disadvantages. These communication systems rely on at least two, electrically insulated wires buried within the ground. If the insulating layer on these wires is compromised, current can leak from the damaged wire into the ground. The copper within the wire begins electrolytic corrosion between the copper and the ground. As the wire corrodes, the amount of current that can be passed through the wire decreases until the corrosion passes completely through the wire, breaking the electrical connection.

Replacing damaged wire typically involves digging up long portions of the wire and therefore can be expensive. Additionally, it can be difficult to determine exactly where a break has occurred.

SUMMARY OF THE INVENTION

A control system for a two-wire power and communication system is described herein. A gateway connects to an irrigation controller and at least two wires that are further connected to a plurality of decoders. The gateway includes an H-bridge circuit that creates an alternating potential at the same potential or lower than the nearby ground. In this respect, when one of the at least two communication wires are damaged, little or no wire corrosion will occur.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
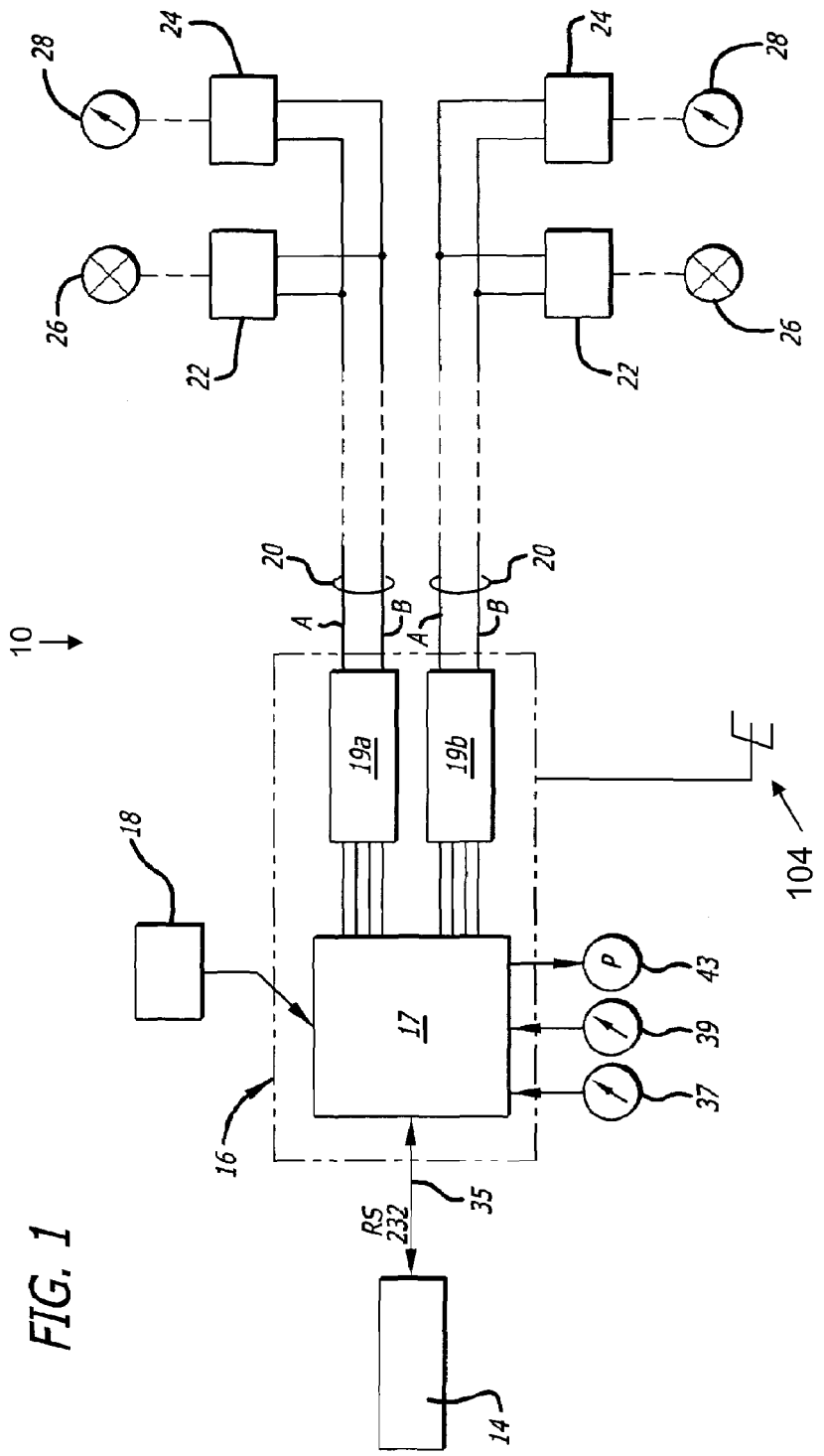
FIG. 1 illustrates a two-wire power and communication irrigation system according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 illustrates an overview of a two-wire power and communication system 10 according to the present invention. A controller 14, such as a PC or stand-alone irrigation controller, is used to program irrigation schedules and to monitor sensor data from the system 10.

A gateway 16 (i.e., a communication interface) is in communication with the controller 14 via communication connection 35. The gateway 16 accepts control signals from the controller 14 and transmits acknowledgments or other device information (e.g., from sensors 37, 39 and 43; watering station decoders 22; or sensor decoders 24) to the controller 14. Additionally, the gateway 16 transmits communication data such as commands (e.g., open or close a valve) to specific device decoders such as watering station decoders 22 and sensor decoders 24

In one example embodiment, the gateway 16 contains a motherboard 17 and a pair of daughterboards 19a and 19b that receive power from a power source 18. Each of the daughterboards 19a, 19b include a connection to wires A and B of their respective cables 20, selectively applying potentials (e.g., 1. +40 V on A with respect to B; 2. +40 V on B with respect to A; or 3. an equal potential on both A and B). The daughterboards 19a, 19b are also equipped to detect current drawn by the decoders of the system, and to report that information to the control unit 14 through the motherboard 17. Device decoders such as watering station decoders 22 and sensor decoders 24 are connected in parallel to the wires A and B, and are arranged to operate the system components (e.g. water valves 26 or sensors 28) connected to them.

Note that while wires A and B (i.e., a wire pair) are described as two, single wires, it should be understood that these wires can be made up of multiple wires connected together in series. In other words, wires A and B refer to two different conductive, electrical paths.

An example protocol for the operation of the system of this invention is illustrated in FIGS. 2*a-d*. In this example, the daughterboards 19*a*, b impress a square wave 53 alternating between +40 V (A positive with respect to B) and −40 V (B positive with respect to A) across their respective outputs A and B at a 60 Hz rate. This provides a square-wave power supply (FIG. 2*a*) to all the decoders 22, 24 along the cable 20. As pointed out below, the decoders 26, 28 can use power of either polarity. Because the time of the circuit at one polarity is generally equal to its time at the other polarity, electrolysis problems are minimized.

Figure 2B:
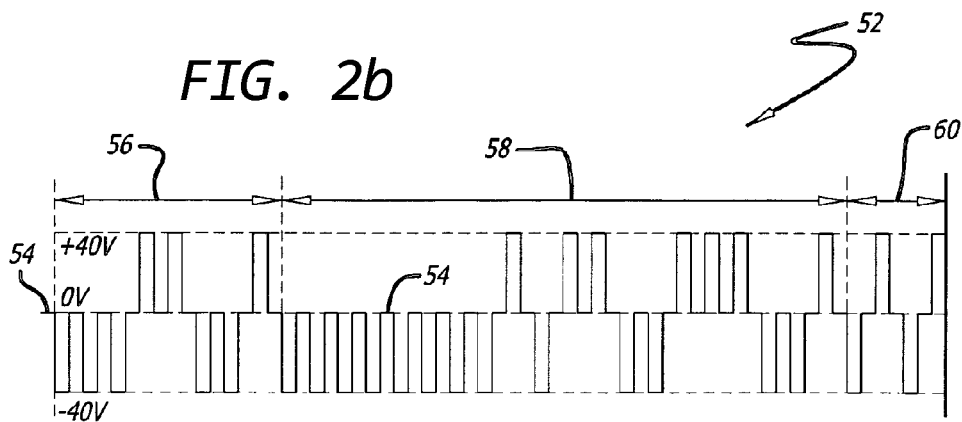
FIGS. 2a-2d illustrates example communication protocols according to the present invention.
Figure 2C:
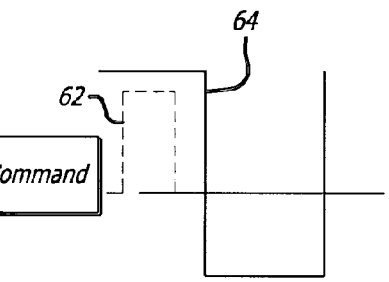
Figure 2A:
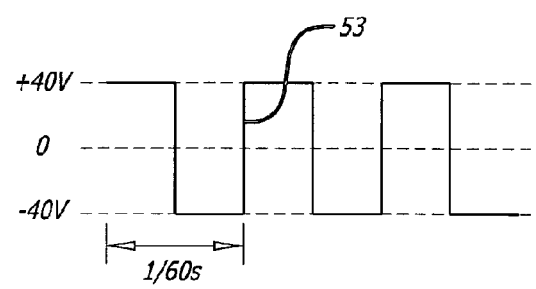
Figure 2D:
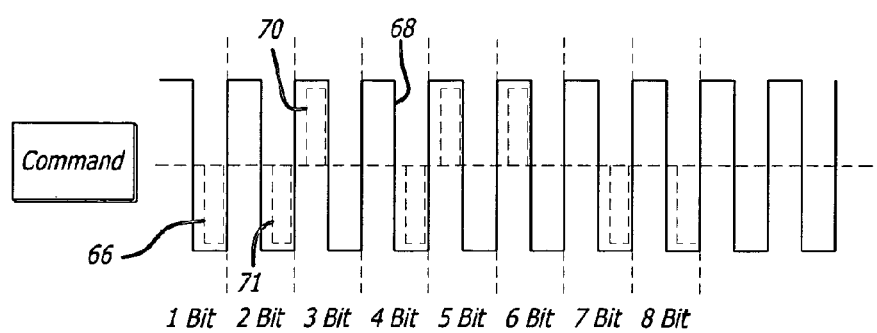

If it is now desired to actuate a specific sprinkler or sensor, the command pulse train 52 shown in FIG. 2*b* is transmitted. The command train begins with a no-power segment 54 in which the wires A and B are both grounded for 1/120 second. This is followed, in the preferred embodiment, by eight pulses 56 separated by similar no-power segments or delimiters 54. The pulses 56 may be either +40 V (signifying a "1") or −40 V (signifying a "0"). Taken together, the pulses 56 define the desired runtime (in minutes) of the device now to be selected.

The next twenty pulses 58, again separated by no-power delimiters 54, define the address of the desired device 26 or 28. Next, the nature of the desired command is specified by the four pulses 60. The command pulse train 52 illustrated in FIG. 2*b* may, for example, convey the command "Turn Station 3 of decoder 2873 on for 25 minutes". Upon completion of the command pulse train, the microprocessor returns control of the wires A and B to the power relays. The output of gateway 16 thus resumes the square-wave format of FIG. 2*a*.

If a selected decoder 26 has received and understood the command (see FIG. 2*c*), it sends an acknowledgment signal by momentarily drawing a high current burst 62 during the +40 V portion of the first square wave 64 following the command pulse train. This is detected by a current sensor of the gateway 16 and constitutes an acknowledgement that the decoder has received its instruction. If no current is detected during the first square wave 64, a control failure is indicated, and the microprocessor may transmit an alarm to the control device 14.

If the addressed device was a sensor decoder 28 (see FIG. 2*d*), the chosen decoder responds with current bursts 66 during the eight (in the preferred embodiment) square waves 68 following the command train. In each of these square waves, a current burst 70 during the +40 V portion transmits a "1" to the gateway 16, while a current burst 71 during the −40 V portion transmits a "0". As in the case of a station decoder 26, the lack of any current burst during a square wave 68 indicates a system failure and may trigger an alarm. Additional operational details of this system can generally be found in U.S. Pat. No. 7,358,626, the contents of which are incorporated by reference.

One significant drawback to prior two-wire power and communication systems is that any small nick or damage to one of the field wires within the ground can cause the wire to corrode and disintegrate relatively quickly. In this respect, the entire wire must be dug up and replaced or somehow sufficiently repaired (i.e., connected and insulated) so that further corrosion does not occur.

Figure 3:
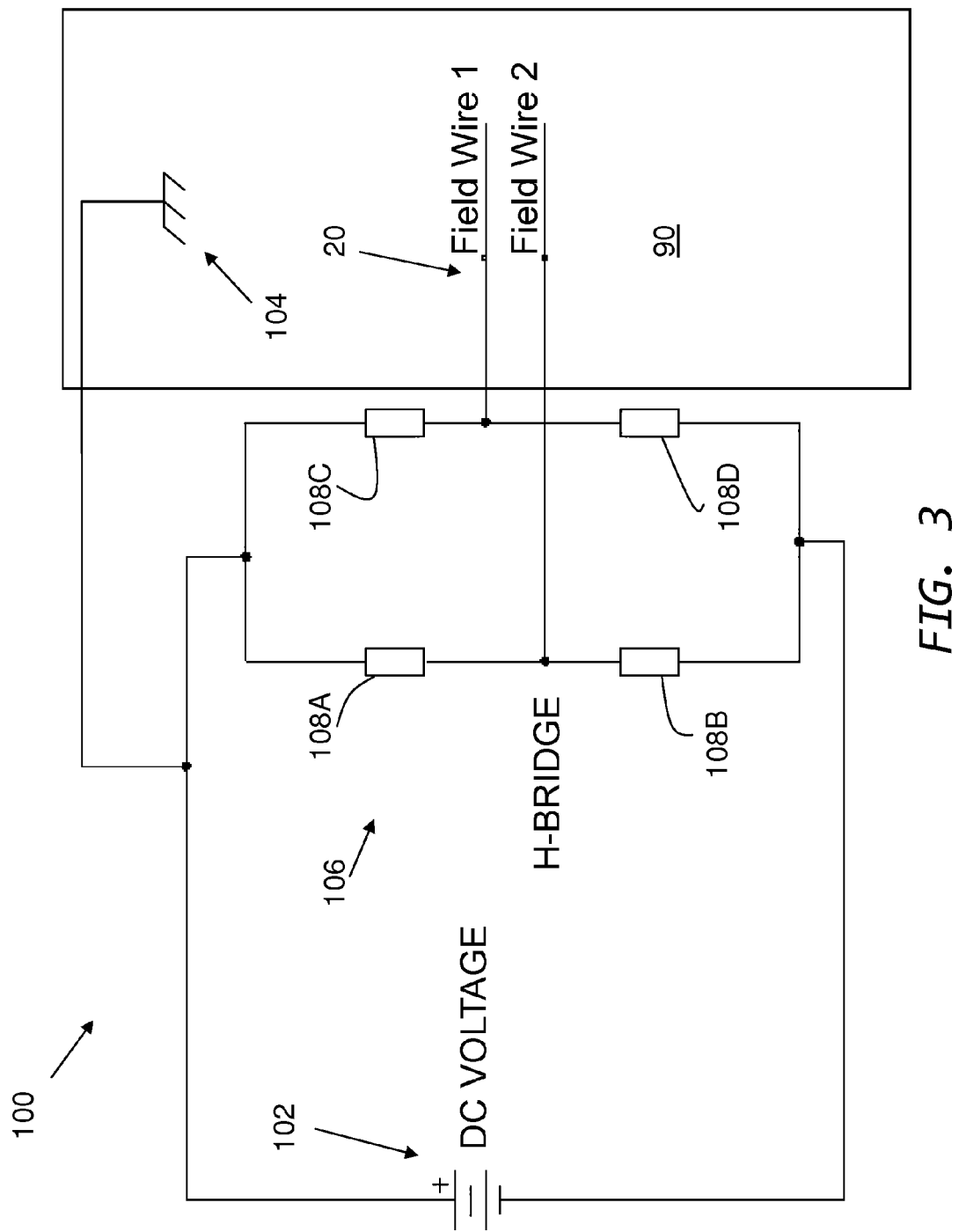
FIG. 3 illustrates an example communication circuit according to the present invention that maintains an electrical potential equal to or less than nearby ground.

Preferably, the gateway 16 includes a current alternating circuit 100 as seen in FIG. 3 which prevents corrosion of the field wires 20 located within the soil 90. Specifically, the current alternating circuit 100 is configured such that even if the field wires A and B are damaged, no corrosion will occur with the exposed metal of the wire at the damage location.

A DC power supply 102 provides a predetermined amount of power to the circuit 100 (e.g., 40 v). This DC power is supplied to an H-bridge circuit 106 which creates the previously described, alternating pulses over field wires A and B.

Figure 4:
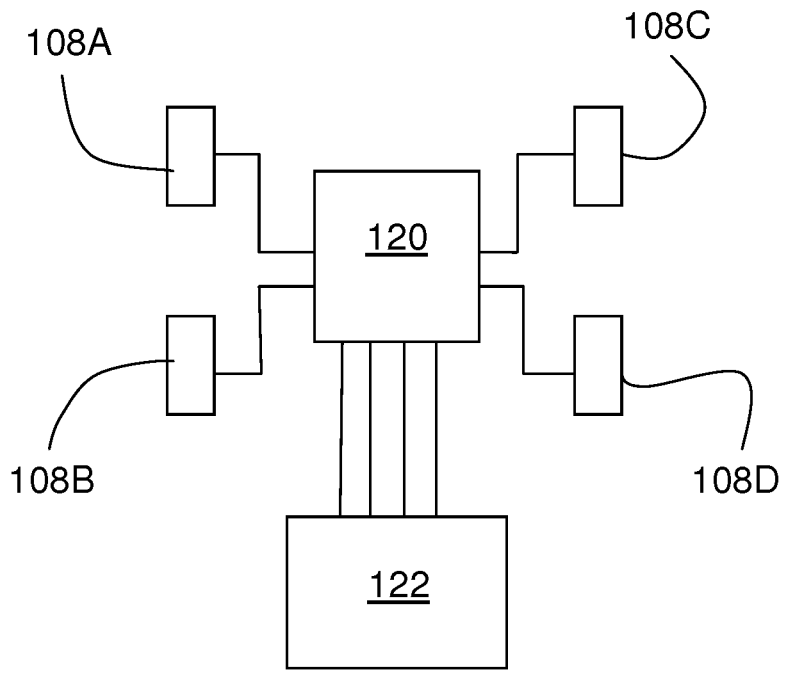
FIG. 4 illustrates an example H-bridge circuit according to the present invention; and, FIG. 5 illustrates an example H-bridge circuit according to the present invention.

As seen in FIGS. 3 and 4, the circuit 100 is connected to a ground wire 104 which is buried within the soil 90. Preferably the ground wire 104 is connected between the positive terminal of the power supply 102 and the H-bridge circuit 106. In this respect, the ground of the circuit is at the same potential as the soil 90. In one example, the gateway 16 includes an external earthground port (e.g., a clamp or nut) that allows a user to connect the ground wire 104 to it. Alternately, the ground wire 104 is permanently fixed to the gateway 16. Preferably, the ground wire 104 includes a layer of insulation along most of its length, leaving an exposed and electrically conductive end region. For example, this end region may terminate in a plurality of fingers as shown in FIG. 3.

Preferably, the H-bridge circuit 106 includes four switches 108A-108D. Field wire A is connected between switches 108C and 108D while field wire B is connected between switches 108A and 108B.

As seen in FIG. 4, the H-bridge circuit 106 can be an H-bridge circuit having a processor 120 that is connected to and in control of switches 108A-108D. A main processor 122 for the gateway 16 is connected to the processor 120, sending control commands to the processor 120. The processor 120 interprets these commands by turning various combinations of switches 108A-108D on or off.

Figure 5:
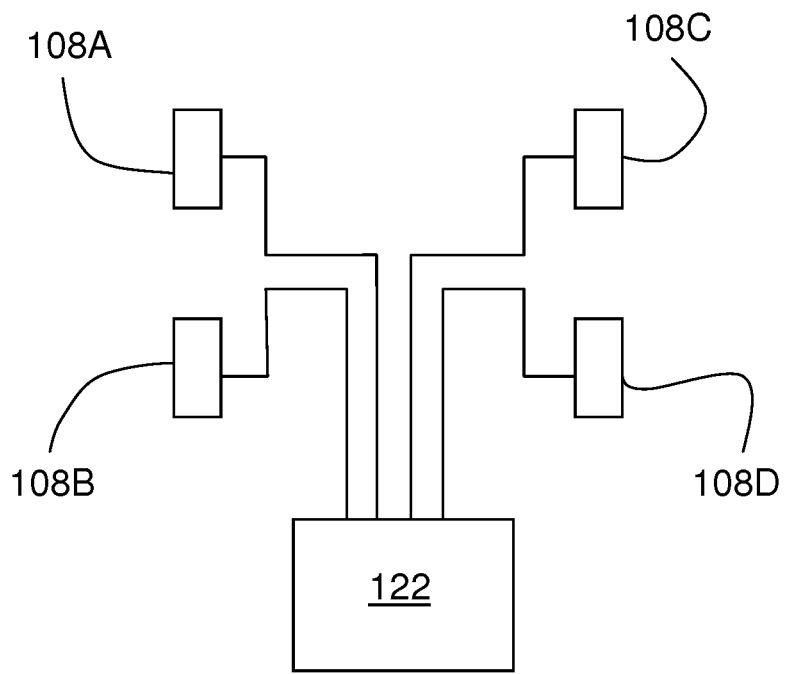

Alternately, the switches 108A-108D of the H-bridge circuit 106 can be directly connected to and controlled by the main gateway processor 122 as seen in FIG. 5. In this respect, the main processor 122 directly controls when each switch 108A-108D is opened or closed to achieve a desired communication signal (e.g., an alternating DC pulse).

It should also be understood that either of the H-bridge examples shown in FIGS. 4 and 5 can be composed of discrete switches or can be integrated onto a single chip.

Returning to FIG. 3, the main processor 122 (not shown in FIG. 3) preferably creates the alternating current pulses by closing switches diagonal to each other. For example, switches 108B and 108C may be momentarily closed while switches 108A and 108D may be opened, creating a −40V pulse on filed wires A and B. In another example, switches 108A and 108D may be momentarily closed while switches 108B and 108C may be opened, creating a +40V pulse on filed wires A and B. This pattern can alternate, for example, at about 60 Hz.

If field wires A or B become damaged, they make electrical contact with the soil 90. However, as seen in FIG. 3, the current alternating circuit 100 includes the ground wire 104 connected between the power supply 102 and the H-bridge circuit 106 which grounds the circuit 100 to the earth or soil 90. Hence, when an insulating layer on field wires A or B is damaged, there is no potential difference between the ground of the circuit 100 (provided by ground wire 104) and the connection between the damaged wire and the soil 90.

The alternating voltage generated by the H-bridge circuit 106 will always be at or below earth ground potential. In other words, one field wire will be at ground potential and the other will be at a negative voltage relative to the first. When polarity switches, the other field wire is at ground potential and the other field wire is at a negative voltage relative to the first. Hence, the field wires A and B act as cathodes instead of anodes, preventing corrosion.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A gateway for an irrigation system comprising:
    a first connection connectable to an irrigation controller, said first connection transmitting device information and accepting control signals from said irrigation controller;
    a second connection connectable to at least two power and communication wires;
    a communication circuit connected to said second connection to provide alternating current thereon; said communication circuit comprising:
        a power supply; and
        an H-bridge circuit;
    a ground connection connected to a ground wire located at least partially outside of said gateway for contact with soil; said ground connection electrically coupled to a positive terminal of said power supply and said H-bridge circuit, and thereby preventing corrosion to said at least two power and communication wires when said at least two power and communication wires become damaged; and,
    a microprocessor coupled to said H-bridge circuit and producing alternating current pulses on said at least two wires.

2. The gateway of claim 1, wherein said H-bridge circuit is an H-bridge circuit further comprising a second microprocessor.

3. The gateway of claim 1, wherein said H-bridge circuit comprises four switches.

4. The gateway of claim 1, further comprising a first electrical path having a first and second switch, and a second electrical path having a third and fourth electrical switch.

5. The gateway of claim 1, wherein said ground wire further comprises a plurality of conductive fingers at a distal end of said ground wire.

6. The gateway of claim 1, wherein said microprocessor is configured to alternate a voltage potential on said second connection at 60 Hz.

7. The gateway of claim 6, wherein said microprocessor is configure alternate about 40V on said second connection.

8. A gateway for providing power and communications comprising:
    a first connection communicating with an irrigation controller;
    a second connection configured for connection to at least two power and communication wires;
    a power supply;
    an H-bridge circuit electrically coupled with said power supply;
    said H-bridge circuit coupled to said second connection for providing alternating voltage between said at least two power and communication wires;
    a microprocessor in communication with said H-bridge circuit, said microprocessor directing said alternating voltage; and,
    a ground connection coupled to an external ground wire disposed in soil; said ground connection electrically coupled between a positive terminal of said power supply and said H-bridge; said ground connection preventing corrosion of said at least two power and communication wires subsequent to damage to said at least two power and communication wires.

9. The gateway of claim 8, wherein said H-bridge circuit is an integrated H-bridge circuit.

10. The gateway of claim 8, wherein said H-bridge circuit comprises four switches.

11. The gateway of claim 8, further comprising a first electrical path having a first and second switch, and a second electrical path having a third and fourth electrical switch.

12. The gateway of claim 8, wherein said microprocessor is configured to alternate a voltage potential on said second connection at 60 Hz.

13. The gateway of claim 8, wherein said microprocessor is configure alternate about 40V on said second connection.

14. A method of preventing corrosion with a two-wire power and communication system comprising:
    providing a gateway;
    accepting control commands from an irrigation controller with said gateway;
    transmitting an alternating voltage with said gateway over two wires coupled to a decoder;
    maintaining said alternating voltage at or below a potential of nearby soil; and,
    preventing corrosion of said two wires when said two wires are damaged.

15. The method of claim 14, wherein said transmitting an alternating voltage further comprises selectively opening and closing a plurality of switches on an H-bridge circuit.

16. The method of claim 15, wherein said maintaining said alternating voltage at or below a potential of nearby soil further comprises grounding said H-bridge circuit via an external connection to said nearby soil.

17. The method of claim 16, wherein said transmitting an alternating voltage further comprises alternating about 40V at about 60 Hz.

18. The method of claim 17, wherein said grounding said H-bridge circuit further comprises connecting said external connection between a positive terminal of said power supply and said H-circuit.

* * * * *